United States Patent [19]

Weber

[11] Patent Number: 4,518,230
[45] Date of Patent: May 21, 1985

[54] UNIVERSAL BINOCULAR TUBE FOR MICROSCOPES

[75] Inventor: Klaus Weber, Königsbronn, Fed. Rep. of Germany

[73] Assignee: Carl-Zeiss-Stiftung, Heidenheim am Brenz, Fed. Rep. of Germany

[21] Appl. No.: 459,053

[22] Filed: Jan. 19, 1983

[30] Foreign Application Priority Data

Jan. 30, 1982 [DE] Fed. Rep. of Germany ....... 3203142

[51] Int. Cl.³ ...................... G02B 21/18; G02B 27/10
[52] U.S. Cl. .................................. 350/511; 350/502; 350/319; 350/287
[58] Field of Search ............... 350/502, 508, 507, 511, 350/513–516, 319, 287, 173

[56] References Cited

U.S. PATENT DOCUMENTS

| | | | |
|---|---|---|---|
| 2,910,913 | 11/1959 | Michel | 350/502 |
| 2,964,996 | 12/1960 | Klemann et al. | 350/508 |
| 3,887,283 | 6/1975 | Merstallinger et al. | 350/511 |

FOREIGN PATENT DOCUMENTS

| | | | |
|---|---|---|---|
| 31351 | 9/1964 | German Democratic Rep. | 350/502 |
| 862734 | 3/1961 | United Kingdom | 350/502 |
| 1392446 | 4/1975 | United Kingdom | 350/502 |

OTHER PUBLICATIONS

M. Maly et al, *Jour. of Microscopy*, vol. 117, pt. 3, Dec. 1979, pp. 411–416.

Primary Examiner—Jon W. Henry
Attorney, Agent, or Firm—Stonebraker, Shepard & Stephens

[57] ABSTRACT

A universal tube for microscopes has the shape of a block (1) whose front side bears an eyepiece attachment (2) and whose other sides are provided with image inlet or outlet openings (9–13) for auxiliary units which can be selectively attached. For the selection of the proper individual image inlets or outlets, depending on what auxiliary units are attached, two beam switching locations are provided within the tube, at which locations the beam may be deflected. The first switching location has three prisms fastened on a turret (5), each of the prisms having a reflection surface which is located in the same place in all switch positions of the turret and serves for coupling the eyepiece attachment to the different beams. The second switching location is where the optical axes of the individual image inlets and outlets (9–13) intersect each other. These inlets and outlets are provided with guides (14) along which interchangeable mirror elements can be inserted up to the point of intersection of the axes.

9 Claims, 7 Drawing Figures

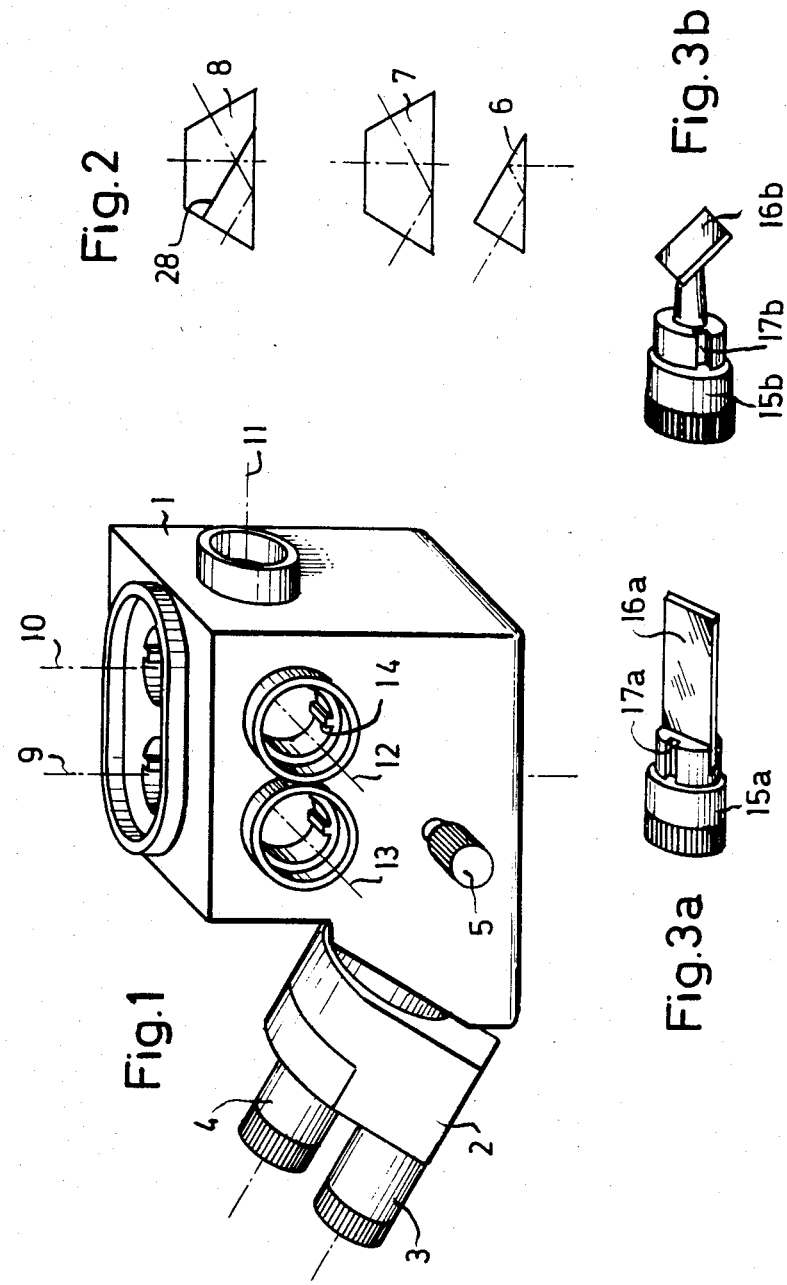

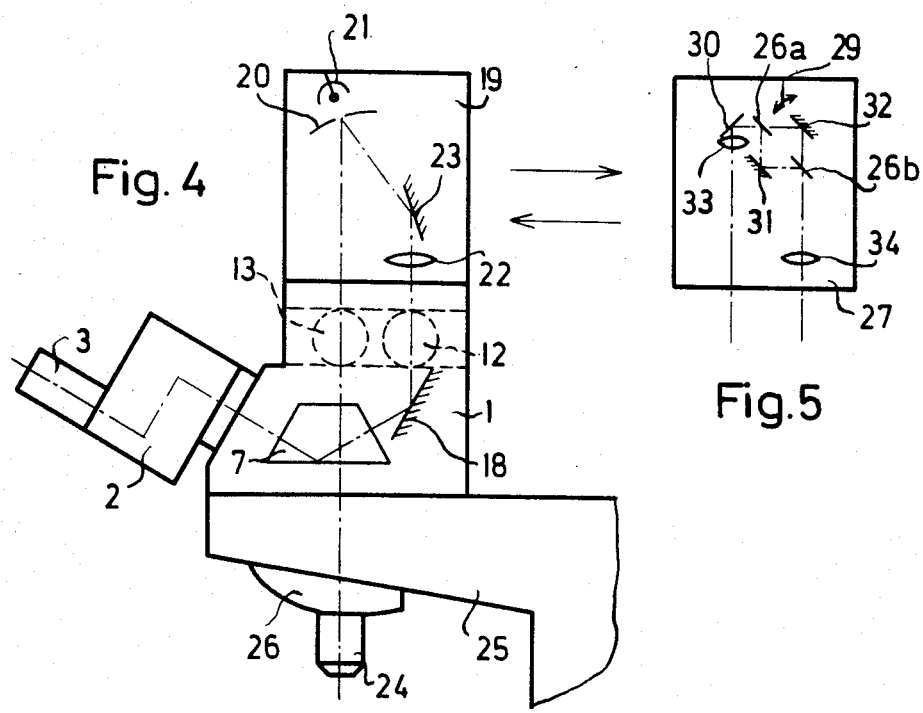
Fig. 4
Fig. 5
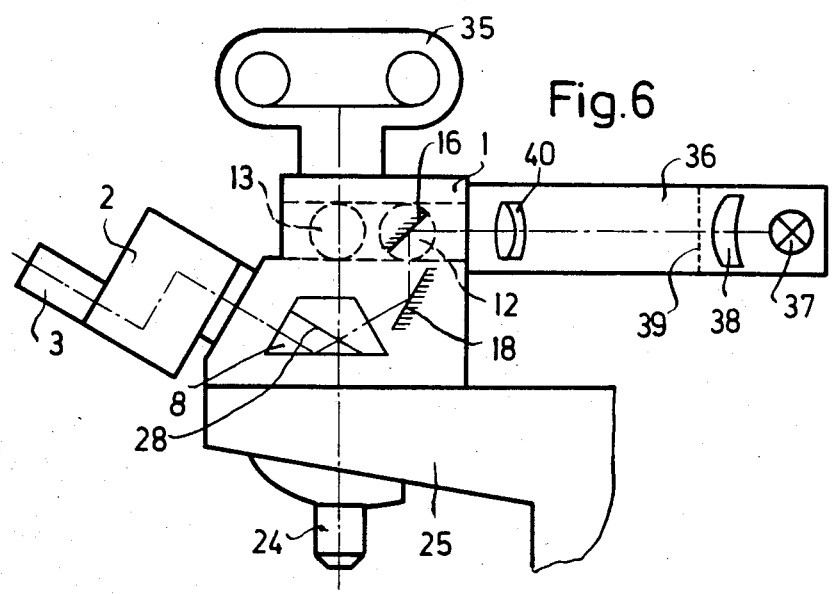
Fig. 6

UNIVERSAL BINOCULAR TUBE FOR MICROSCOPES

BACKGROUND OF THE INVENTION

The present invention relates to a binocular tube for microscopes having at least two image inlets and/or outlets for attachments, and a switchable mirror turret by which the objective ray path can be switched as desired to the eyepiece either directly or via an attachment (bypass loop) connected to the image inlet or outlet.

Such tubes are known, for instance, from West German Pat. No. 24 06 415, the application for which was published on Oct. 24, 1974, in which the attachment is a photometer attachment. With the mirror (prism) inserted, the entire light coming from the objective is reflected into the eyepiece, while with the mirror not inserted, the object is focused via an image outlet onto the reflecting photometer diaphragm and reflected back by the latter through a second image inlet into the eyepiece. In this switched position, the image of the diaphragm is then superimposed on the microscopic image.

This known tube is not directly adapted to bear other attachments instead of the photometer device described.

From U.S. Pat. No. 3,421,806 of Weber, granted Jan. 14, 1969, there is known a photometer microscope which has a first beam path used both as outlet and inlet for the reflecting back of an illuminated diaphragm and another, second beam path used as outlet for an attachment camera as shown in FIG. 5 of the patent.

The arrangement described therein of the mirror elements has the disadvantage that light which is conducted to the photometer or is reflected via the diaphragm reflection into the eyepiece is passed several times, namely up to five times, through beam splitters, whereby a considerable reduction in light intensity results.

The object of the present invention is to create a binocular tube which is suitable for the attaching of different attachments and on which therefore a still or motion picture camera unit or a plotting apparatus can be placed instead of a photometer attachment.

SUMMARY OF THE INVENTION

This object is achieved in accordance with the invention by providing the mirror turret with a further switch position in which a mirror element acts as beam splitter, and providing at least one other image inlet or outlet to which switching can be effected, via a second switchable mirror element, instead of one of the first image inlets or outlets.

In the tube of the present invention the additional outlet can be used without great expense alternatively for reflecting out of the outlet of the bypass line as well as for reflecting into the return line, while the inlets and/or outlets of the bypass line are adapted for the attachment of another supplementary instrument, for instance a camera. In two switch positions of the first mirror element, in each case 100 percent of the light to be used is reflected into the additional instruments, for instance the camera, or from the additional instruments, for instance the plotting apparatus into the eyepiece. In the third switch position the light is split up from the objective to the eyepiece or to the camera or from the plotting apparatus to the eyepiece and to the camera by a single beam-splitter surface, as a result of which the light coming from the object is thus optimally utilized.

The mirror turret is advantageously formed of three different prisms, each of which has a reflective surface which is in the same position in all switch positions and serves to reflect the light into the eyepiece. These prisms can, for instance, be of such nature that the first prism, a double-reflecting triangular prism, reflects 100 percent of the incoming light into the eyepiece, while the second prism, which is in the form of a trapezoidal prism permits the light which comes from the objectives and impinges perpendicularly onto the parallel surfaces of the prism to pass 100 percent in the direction toward the first outlet, and that only one return line reflects light which strikes perpendicularly on one of the two side surfaces to the base surface and also mirrors it 100 percent into the eyepiece. The third prism then consists of a trapezoidal prism which is divided by an internal beam-splitter layer into a triangular prism and a supplementary part, the triangular prism having the same shape as the first prism.

The second mirror element is advisedly developed as an interchangeable part, and can be introduced optionally by insertion into additional openings the axes of which extend in each case through one of the points of intersection of the third image inlet or outlet with one of the first two outlets or inlets into the ray path thereof. In this way the third image opening can be used optionally as outlet or inlet.

All inlets and outlets are advisedly provided with guides for the second replaceable mirror element, the guides fixing the position of said element. Thus, in principle, all openings can be used as image outlets.

Further advantageous embodiments will be explained below.

BRIEF DESCRIPTION OF THE DRAWINGS

FIG. 1 is perspective view of a tube in accordance with the invention;

FIG. 2 is a schematic sectional illustration of the three prisms which can be switched by means of the slide 5 shown in FIG. 1;

FIG. 3a is a perspective view of an interchangeable second mirror element for the tube of FIG. 1;

FIG. 3b is a different embodiment of the mirror element of FIG. 3a;

FIG. 4 is a basic diagram of the tube of FIG. 1 provided with a photometer attachment;

FIG. 5 is a basic diagram of a double-image measurement attachment for the tube of FIG. 1; and FIG. 6 is a basic diagram of the tube of FIG. 1 provided with camera attachment and attached projection unit.

DESCRIPTION OF THE PREFERRED EMBODIMENTS

The tube shown in FIG. 1 consists of a substantially block-shaped housing 1 onto the beveled front side of which an eyepiece holder 2 is fastened in such a manner that the eyepieces 3, 4 form an angle of approximately 30° with the bottom of the tube 1 which is adapted to be placed on the lens mount of a microscope. The tube 1 has eight openings, only five of which are visible, namely the openings 9, 10 at the top, the opening 11 at the rear, as well as the openings 12 and 13 on the right-hand side of the tube. There are not visible two other openings along the extension of the openings 12, 13 on the left-hand side as well as one opening on the front of the tube.

By means of a knob 5 a slide can be actuated which has three different switch positions in which one of the three prisms shown in FIG. 2 can be placed into the path of the beam.

Each of the openings 9–13 is provided with a guide such as the longitudinally extending rib 14 for cooperating with a mating part, such as the longitudinal grooves 17a and 17b (shown in FIGS. 3a and 3b) of the holders 15a and 15b which carry the second mirror elements 16a and 16b, respectively, and which are insertable in the openings.

As shown in FIG. 4, a photometer module 19 can be placed on the top of the tube 1. It has a diaphragm in the form of an opening in a concave mirror 20 behind which a photocell 21 is arranged. The intermediate image produced on the mirror 20 and on which the diaphragm opening is superimposed is focused, via the mirror 23 and the optical system 22 as well as the mirror 18 within the tube 1 after reflection against the base of the trapezoidal prism 7, once again into the eyepiece 3, 4. In this configuration all openings except for the opening 9 serving as image outlet and the opening 10 (FIG. 1) serving as image inlet (return line) are closed.

Instead of the photometer module 19, a double-image measurement attachment 27, such as shown in FIG. 5, can also be placed on the tube 1. It contains two beam-splitters/combiners 26a and 26b by which the beam is branched off, as well as two deflection mirrors 31 and 32, the latter being swingable by small amounts around an axis extending perpendicular to the plane of the drawing. A swinging of the mirror 32 effects a splitting up of the intermediate image produced in the eyepieces for measurement purposes.

In FIG. 6, the tube 1 is shown with a camera 35 attached. Through the outlet 9, the camera receives 70 percent of the light passed by the beam-splitter surface 28 in the prism 8. 30 percent of the light, after reflection at the beam-splitter surface 28, passes into the eyepieces 3, 4. After the insertion of one of the two other prisms 6 or 7, 100 percent of the light coming from the microscope objective 24 passes either to the camera 35 (if the prism 7 is used) or into the eyepieces 3, 4 (if the prism 6 is used).

The mirror element shown in FIG. 3a, whose mirror 16a connects the opening 11 as an additional inlet to the optical system of the tube 1, is pushed into the opening 12. To this opening 11 there is attached a projection attachment 36 which, by means of the optical system 40, superimposes the image of the graticule 39 illuminated by a lamp 37 and the collector 38 on the intermediate images in the eyepieces 3, 4 and on the film plane of the camera 35. The graticule can, for instance, bear a scale which is to be superimposed on the image and a format border as an aid in setting for the user.

It is readily possible, should this be necessary due to considerations of space or stability, to place the projection attachment 36 on the opening 10 of the tube 1 and to place the camera 35 on the rear opening 11. In this arrangement the mirror 16a must be removed from the opening 12 and inserted into the opening 13 or replaced by the mirror 16b of the element shown in FIG. 3b, which is then inserted into the opening 9.

Of course, it is also possible to attach the camera 35 or the projection attachment 36 to one of the side openings. In that case, two of the mirror elements shown in FIG. 3a are inserted, one in the first opening and one in the rear opening 11, or two of the elements shown in FIG. 3b are inserted into each opening which lies opposite the added attachment part.

If, differing from the configuration shown in FIG. 4, a television camera is attached instead of the projection attachment 36 and if instead of a full mirror 16a a beam splitter which has been inserted into the opening 13 is used, then both apparatus can be operated simultaneously on the tube 1.

The embodiments described above do not represent a limitative enumeration of the possible variations of the binocular tube of the invention. Rather, a number of additional configurations, which have not been shown due to considerations of space, can be realized with the universal tube.

The optical tube of the present invention and the microscope with which it is used are supported in any desired manner, for example by the conventional bracket 25 shown in FIGS. 4 and 6.

The respective reference numerals 9, 10, 11, 12, and 13 are intended to refer both to the respective openings in the walls of the structure, and to the respective optical axes passing centrally through each of the respective openings, the context indicating in each instance whether the opening itself or its optical axis is meant.

What is claimed is:

1. An optical tube structure for use with a microscope to enable a beam of light from a microscope objective to be directed, alternatively, either (a) entirely to a binocular eyepiece, or (b) entirely to an auxiliary unit which will return a reflected beam back, with provision for directing said reflected beam to said eyepiece, or (c) partly to the eyepiece and partly to a camera, said structure comprising:

a hollow body having a plurality of outer walls including a first wall, a second wall, a third wall, and a front wall;

a binocular eyepiece mounted on said front wall;

said body being mountable on a microscope in such position that a light beam from an objective of said microscope will enter said body along a first optical axis substantially perpendicular to said first wall;

a first access opening (9) in said first wall and a second optical axis extending through said first opening;

a second access opening (10) in said first wall and a third optical axis extending through said second opening;

said second optical axis and said third optical axis being parallel to each other;

a third access opening (12) in said second wall and a fourth optical axis extending through said third opening;

a fourth access opening (13) in said second wall and a fifth optical axis extending through said fourth opening;

said fourth optical axis intersecting said third optical axis, and said fifth optical axis intersecting said second optical axis;

a fifth access opening (11) in said third wall and a sixth optical axis extending through said fifth opening;

said sixth optical axis intersecting the second, third, fourth, and fifth optical axes;

adjustable turret means having a plurality of prisms including a first prism (6), a second prism (7), and a third prism (8), said turret means being adjustable to position any selected one of said prisms at an effective operating position in said first optical axis; and a fixed reflecting surface in said body;

said first prism (6) being movable by operation of said turret means to an effective position wherein all of a light beam entering said tube structure from a microscope objective along said first optical axis will be directed by said first prism to said eyepiece;

said second prism (7) being movable by operation of said turret means to an effective position wherein all of a light beam entering said tube structure along said first optical axis will pass through said second prism and exit from said tube structure along said second optical axis to an auxiliary unit (19, 27) mounted on said first wall and light reflected back by said auxiliary unit and entering said tube structure along said third optical axis will be directed by said fixed reflecting surface to a path leading to said eyepiece;

said third prism (8) being movable by operation of said turret means to an effective position wherein a light beam entering said tube structure along said first optical axis will be split by said third prism and part of the light in said beam will be directed by said third prism to said eyepiece and part of said light will exit from said tube structure along said second optical axis to an auxiliary unit (35) mounted on said first wall.

2. The invention defined in claim 4, wherein said auxiliary mirror (16a, 16b) is movable to an effective position wherein and whereby a beam of light projected into said tube structure along said sixth optical axis from a graticule projector (36) mounted on said third wall will fall on said auxiliary mirror and be directed thereby to said fixed reflecting surface and thence to a prism in its effective operating position.

3. The invention defined in claim 1, further comprising an auxiliary mirror (16a, 16b) selectively insertable in said tube structure in position to cause a beam of light passing along the optical axis of one of said openings to be directed along a second optical axis of a different one of said openings.

4. The invention defined in claim 3, further comprising a carrier (15a, 15b) for supporting said auxiliary mirror, said carrier being insertable in any selected one of said openings, and cooperating means on said tube structure and said carrier (14, 17a, 17b) for insuring proper orientation of the carrier and the mirror carried thereby when the carrier is inserted in one of said openings.

5. An optical tube structure for use with a microscope to enable a beam of light from a microscope objective to be directed, alternatively, either (a) entirely to a binocular eyepiece, or (b) entirely to an auxiliary unit which will reflect a beam back to said eyepiece, or (c) partly to the eyepiece and partly to a camera, said structure comprising:

a hollow body having a plurality of outer walls including a first wall, a second wall, a third wall, and another wall;

a binocular eyepiece mounted on said other wall;

said body being mountable on a microscope in such position that a light beam from an objective of said microscope will enter said body along a first optical axis substantially perpendicular to said first wall;

a first access opening (9) in said first wall and a second optical axis extending through said first opening;

a second access opening (10) in said first wall and a third optical axis extending through said second opening;

an access opening (11) in said third wall and an optical axis extending through said opening (11) and intersecting both said second and third optical axes at first and second intersection points, respectively;

adjustable turret means having a plurality of prisms including a first prism (6), a second prism (7), and a third prism (8), said turret means being adjustable to position any selected one of said prisms at an effective operating position in said first optical axis;

a fixed reflecting surface (18) in said body; and mirror means (16a, 16b) shiftable into and out of effective operating position at said first intersection point and shiftable into and out of effective operating position at said second intersection point;

said first prism (6) being movable by operation of said turret means to an effective position wherein all of a light beam entering said tube structure from a microscope objective along said first optical axis will be directed by said first prism to said eyepiece;

said second prism (7) being movable by operation of said turret means to an effective position wherein all of a light beam entering said tube structure along said first optical axis will pass through said second prism and exit from said tube structure along said second optical axis to an auxiliary unit (19, 27) mounted on said first wall and light reflected back by said auxiliary unit and entering said tube structure along said third optical axis will be directed by said fixed reflecting surface to said second prism and by said second prism to said eyepiece;

said third prism (8) being movable by operation of said turret means to an effective position wherein a light beam entering said tube structure along said first optical axis will be split by said third prism and part of the light in said beam will be directed by said third prism to said eyepiece and part of said light will exit from said tube structure along said second optical axis to an auxiliary unit (35) mounted on said first wall;

said mirror means in effective operating position at one of said intersection points being an element of a light beam path from said microscope objective to said access opening in said third wall;

said mirror means in effective operating position at another of said intersection points being an element of a light beam path between said binocular eyepiece and said access opening in said third wall.

6. The invention defined in claim 5, wherein said optical axis extending through said opening (11) in said third wall intersects said second and third optical axes at right angles.

7. The invention defined in claim 5, wherein said mirror means comprises an interchangeable part.

8. The invention defined in claim 5, further comprising two light access openings (12, 13) in said second wall, both of said openings having optical axes which are parallel to and offset from each other and which respectively intersect said second optical axis and said third optical axis.

9. The invention defined in claim 5, wherein said mirror means comprises an interchangeable part, and wherein said light access openings in said first wall and said second wall have guide means (14) cooperating with said interchangeable part to control positioning of said interchangeable part when inserted in any one of said light access openings.

* * * * *